Sept. 10, 1940.  J. W. MYERS  2,213,993
LOAD LIMITING FLASH CONTROL SYSTEM FOR ELECTRIC RANGES AND THE LIKE
Filed March 7, 1938  5 Sheets-Sheet 1

Fig. 1.

Inventor:-
Joseph W. Myers
by his Attorneys
Howson & Howson

Sept. 10, 1940.  J. W. MYERS  2,213,993
LOAD LIMITING FLASH CONTROL SYSTEM FOR ELECTRIC RANGES AND THE LIKE
Filed March 7, 1938  5 Sheets-Sheet 2

Fig. 2.

Inventor:-
Joseph W. Myers
by his Attorneys
Howson Howson

Sept. 10, 1940.  J. W. MYERS  2,213,993
LOAD LIMITING FLASH CONTROL SYSTEM FOR ELECTRIC RANGES AND THE LIKE
Filed March 7, 1938  5 Sheets-Sheet 3

Inventor:-
Joseph W. Myers
by his Attorneys
Howson Howson

Patented Sept. 10, 1940

2,213,993

UNITED STATES PATENT OFFICE 2,213,993

LOAD LIMITING FLASH CONTROL SYSTEM FOR ELECTRIC RANGES AND THE LIKE

Joseph W. Myers, Philadelphia, Pa., assignor to Proctor & Schwartz, Incorporated, Philadelphia, Pa., a corporation of Pennsylvania Application March 7, 1938, Serial No. 194,498

26 Claims. (Cl. 219—20)

This invention relates to control systems for electric range cooking units and the like and, more particularly, to novel means for effecting rapid heating of such units by increasing their energization to above normal, while limiting the total connected load of the entire apparatus to prevent overload on the supply line.

The use of electric ranges and other electrical devices employing surface cooking plates has been limited or retarded in the past by the fact that such devices require appreciable time to attain their normal operating temperature and heat output and in this respect are not comparable in operation to gas ranges. It is well known that electric ranges have certain definite advantages over gas ranges but such advantages have generally been outweighed by the inherent inability of electric range units to rise rapidly to their normal operating temperature. Moreover, electrical devices of this type which have been proposed or used have not had the degree of flexibility of operation that obtains in the gas range and this is a further reason why gas ranges have frequently been employed in the past in preference to electric ranges.

It has been proposed heretofore to "flash" an electrical heating unit, that is increase its energization, to cause the unit to heat rapidly to a desired predetermined temperature level, thus eliminating the objectionable inherent slow action of prior heating devices of this class. In order to do this, however, it is necessary to increase the energy consumption or load of the heating unit being flashed which, of course, increases the total load of the entire apparatus. A convenient method of flashing or over-energizing an electric heating unit is to divide the unit into a plurality of sections which are normally connected in series relation, and to change the connection of the sections from series to parallel relation to thus increase the energization of the unit. In a specific example, if the heating unit comprises two sections of equal resistance, the parallel connection of the sections will reduce the resistance of the unit to one-fourth of that obtaining when the sections are connected in series relation, and as a result the current drawn by the unit will be increased to four times that drawn by the series-connected sections. For a given applied voltage, therefore, the power or energy consumption will be four times the normal consumption.

A conventional electric range may have four surface cooking units, two of which may have a normal high rating of 2000 watts each, while the other two may have a rating of 1200 watts each. This constitutes a surface cooking connected load of 6400 watts. The oven unit of the range may have a rating of 2000 watts and, therefore, the total connected load of the entire range may be 8400 watts. From the example above assumed, it will be seen that if all of the surface heating units were adapted to be flashed or over-energized simultaneously by temporarily connecting their sections in parallel relation, the total load of the surface units might be as high as 27,600 watts. Obviously this could not be permitted since such a high load would not only cause a large drop in the line voltage but would also draw such a large amount of current that the normal equipment and wiring would be inadequate. Moreover, devices of this class are frequently employed during the periods of peak demand and any considerable increase in the total connected load during such periods is objectionable, as well understood. Furthermore, common supply lines are frequently employed for both lighting and cooking, and voltage fluctuations due to unusually large or sudden current demands may cause annoying dimming of the lights which are supplied by the common line. Further still, it is customary in many localities to base the charge for the use of electric current on a combination demand and actual use basis and, where this is the case, the use of such an extremely high connected load would make the cost of using an electric range prohibitive, even if the wiring and metering equipment were made adequate to handle the large current.

On the other hand, it is desirable that more than one of the surface cooking units of an electric range be adapted to be flashed in order that the range may have flexibility of control comparable to that of a gas range. But as shown above, it is impossible or impracticable to provide several cooking units in a single range any number of which may be flashed simultaneously at the will of the user.

It will be seen, therefore, that the provision of satisfactory control means for flashing the surface cooking units of an electric range presents a substantial problem. The present invention effectively solves this problem by controlling the flashing and the total connected load in a manner to prevent the total energy consumption of an electric range from increasing objectionably during flashing of a heating unit. The flashing of a unit by the method above mentioned is so rapid (about 15 to 45 seconds) that it is really unnecessary to have provision for flashing more than one or two units at a time. With this as a premise, the present invention provides a novel control system in which a limited number of a plurality of heating units may be flashed or temporarily over-energized at one time, and the total connected load is prevented from increasing objectionably during the flashing period.

The principal object of the invention, therefore, is to provide a control system in which one or more heating units may be selectively flashed or over-energized without increasing the total connected load of the apparatus objectionably.

Another object of the invention is to provide various embodiments of such a control system embodying the novel features described hereinafter and set forth particularly in the appended claims.

The invention may be clearly understood by reference to the accompanying drawings, wherein

Figs. 3A, 3B and 3C are illustrations of different positions of the control switch of Fig. 3;

Figure 1:
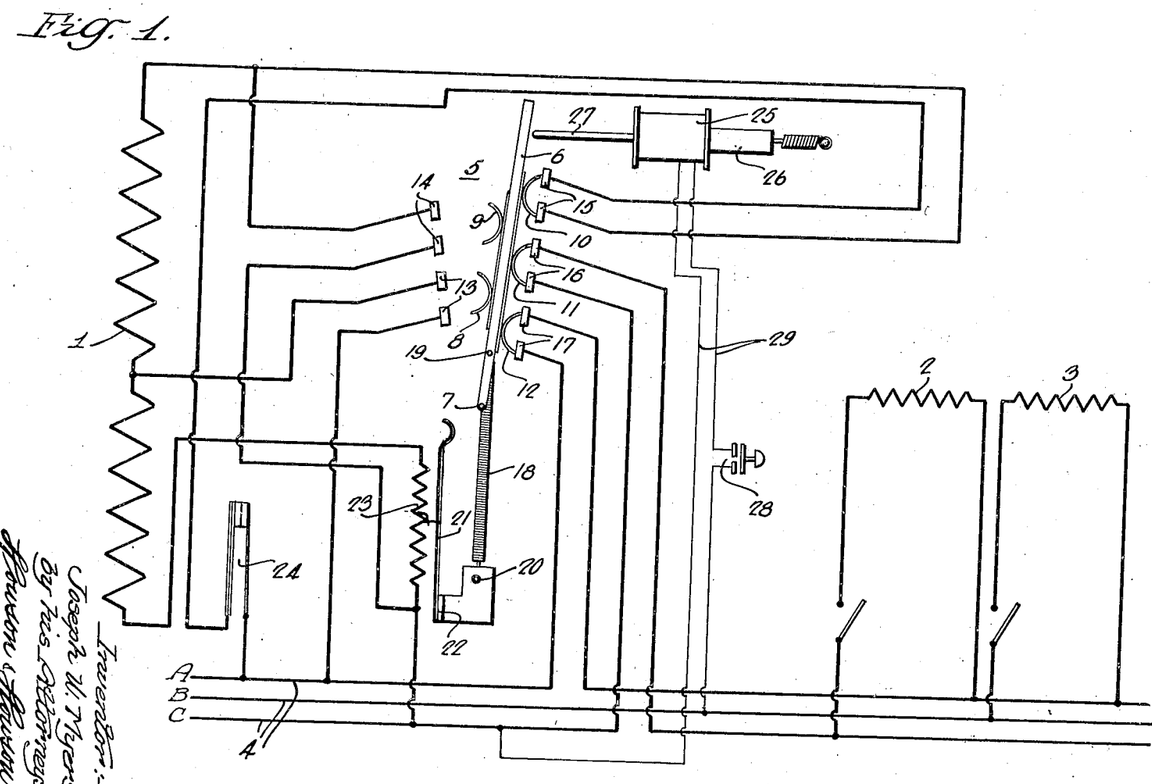
Fig. 1 is a diagrammatic illustration of a simple form of a control system.

Referring to Fig. 1, there is shown a multi-section heating unit 1 which, in the present instance, comprises two sections. The heating units 2 and 3 represent additional load on the supply line 4 which is a conventional three conductor supply line comprising conductors A, B and C. It may be assumed, for example, that the heating unit 1 represents a flashable surface cooking unit of an electric range and that the units 2 and 3 represent any other heating units of the same range. The electric energy will be supplied to the apparatus by connecting the left hand end of supply line 4 to a suitable source, so that there is a relatively high voltage (for example 230 volts) between conductors A and C, and a lower voltage (115 volts) between adjacent conductors.

The flashing of heating unit 1 is controlled by a switch or contactor 5 which comprises an arm 6 pivoted at 7 and carrying contact bridges 8 and 9 on one side and contact bridges 10, 11 and 12 on its opposite side. The contact bridges 8 and 9 are adapted to engage the stationary contacts 13 and 14, respectively. The contact bridges 10, 11 and 12 are adapted to engage the stationary contacts 15, 16 and 17, respectively, as illustrated. The contact bridges are insulated from one another, and to this end the arm 6 may be formed of insulating material. A spring 18 has its upper end connected to the arm 6 at 19, while the lower end of the spring is anchored at a point 20 which is vertically aligned with the pivot point 7. It will be seen that if the arm 6 is moved from either of its positions to a point just beyond the vertical, the spring 18 will forcibly move the arm to its other position. Normally, the arm 6 is maintained by the spring in its right hand position, as shown.

A thermostatic element 21, which may take the form of a bimetallic strip is anchored at 22 and is arranged cooperatively with the spring 18 so that it engages the spring when it flexes toward the right in response to heat from heater element 23. In the diagrammatic illustration the heater is shown adjacent the bimetallic strip but it will be understood that the thermostatic device may be constructed in any suitable manner. For example, the heater may be wound or otherwise mounted on the bimetal strip and suitably insulated therefrom. Such device is described in detail and is claimed in the copending Myers and Roesch application, Serial No. 186,222, filed Jan. 21, 1938. For the present purpose, it suffices to state that the thermostat 21 is adapted to move the arm 6 from its left hand position to its right hand position by deflecting the spring 18 sufficiently to cause such movement of the arm, and the thermostat also serves to control the period during which the arm 6 is in its left hand position, and serves to prevent movement of the arm to its left hand position when the heating unit is already substantially at a predetermined temperature level. The heater 23, which is of relatively low energy-consuming capacity, is connected in circuit with the heating unit 1 so that it receives current when the heating unit is energized. The thermostatic control device comprising element 21 and heater 23 is constructed and arranged to heat and cool proportionately to the heating and cooling of the heating unit, as more fully described in the said copending application, so that this device substantially "tracks" with the temperature of the heating unit and controls the flashing of the unit according to the energization history of the unit. A switch 24 is also included in circuit with the heating unit 1. This switch may take any suitable form; for example, it may be a manually adjustable thermostatic switch of the type disclosed in the above-mentioned copending application, for controlling the operation of the heating unit in response to the temperature of a cooking vessel or the food being cooked. In any case, this switch may be used to deenergize the heating unit when switch 5 is in normal position, but it has no control of the heating unit when switch 5 is in flash position, as will be shown later.

When the contactor arm 6 is in its right hand position, as shown, the sections of heating unit 1 are connected in series relation in an energizing circuit which may be traced from supply conductor A through the switch 24, closed contacts 15, the heating unit sections in series and heater 23 to the supply conductor C. This is the condition for normal energization of the heating unit and, therefore, the other load devices 2 and 3 of the apparatus may be used at will. It will be noted that contacts 16 are included in the supply conductor C, while contacts 17 are included in supply conductor A but, since these contacts are closed, the supply line is completed to the other devices represented by units 2 and 3.

Suppose now that it is desired to flash the heating unit 1 to cause it to heat rapidly to a predetermined temperature. For this purpose, there is provided a solenoid 25 having a spring-biased armature 26 carrying a push-rod 27 which is adapted to engage the contactor arm 6. When the solenoid is energized, the push-rod 27 moves the arm 6 from the position shown to just beyond the vertical so as to cause the spring 18 to move the arm to its left hand position as above mentioned. The push-rod 27 is incapable of moving the arm 6 further than just beyond the center position; that is to say the armature 26 is moved by the solenoid winding only enough to carry the push-rod that far. Hence, the solenoid is only effective to initiate flashing and is incapable alone of effecting flashing. The energization of the solenoid and the consequent actuation of the contactor may be effected at will by means of the push-button switch 28 included in the energizing circuit 29 of the solenoid, which circuit is connected across the supply conductors B and C, as clearly illustrated.

The actuation of the contactor opens contacts 15, 16 and 17 and closes contacts 13 and 14. It will be seen that the sections of heating unit 1 are then connected in parallel relation across the supply conductors A and C independently of switch 24 but with the heater 23 included in one of the parallel branches. One of the parallel branches of the circuit includes the heater 23 and the lower section of heating unit 1, while the other parallel branch includes the closed contacts 14 and the upper section of unit 1. The parallel connection of the sections of unit 1 causes the unit to heat rapidly. When the thermostat 21 has flexed sufficiently toward the right under the influence of heater 23 to cause the thermostat to deflect the spring 18 and move the arm 6 back to its normal position, the normal series connection of the sections of unit 1 is restored. The thermostatic control device comprising the thermostat 21 and its associated heater 23 is designed so that it causes the restoration of the normal energization of heating unit 1 when the unit has been heated substantially to a predetermined temperature.

It will be apparent that the period of flashing of unit 1 will be determined by the instant position of the thermostat 21 at the time that the unit is flashed, and it will also be apparent that if the unit 1 is already heated to the said predetermined temperature, the thermostat 21 will be flexed toward the right in such a position that it will prevent the spring from moving the arm 6 to its left hand position, even though the push-rod 27 may move the arm 6 to a position to initiate the flashing. In other words, in this latter instance, while the flash initiating mechanism may be operated, it is rendered ineffective by the thermostat 21.

During the flashing or over-energization of the heating unit 1 when the contactor arm 6 is in its left hand position, the heating units 2 and 3 are rendered inoperative by virtue of the line conductors A and C being open at contacts 17 and 16, respectively. This prevents energization of the units 2 and 3 during the flashing of unit 1 and thus limits the total load of the device. Since the time required to flash the heating unit 1 is very short (probably less than 45 seconds), the rendering of units 2 and 3 inoperative during the flashing period causes no inconvenience.

It may now be noted that the manner in which the switch 24 is connected prevents the flashing operation from being interrupted by this switch. If this switch were capable of interrupting the flash, the switch 5 would remain in flash position due to such interruption, and the other units 2 and 3 would be inoperative until the switch 24 were closed and the flash completed. The arrangement illustrated prevents this, however, and insures completion of the flash so that the other units are inoperative only during the short period required to flash the unit 1.

Figure 2:
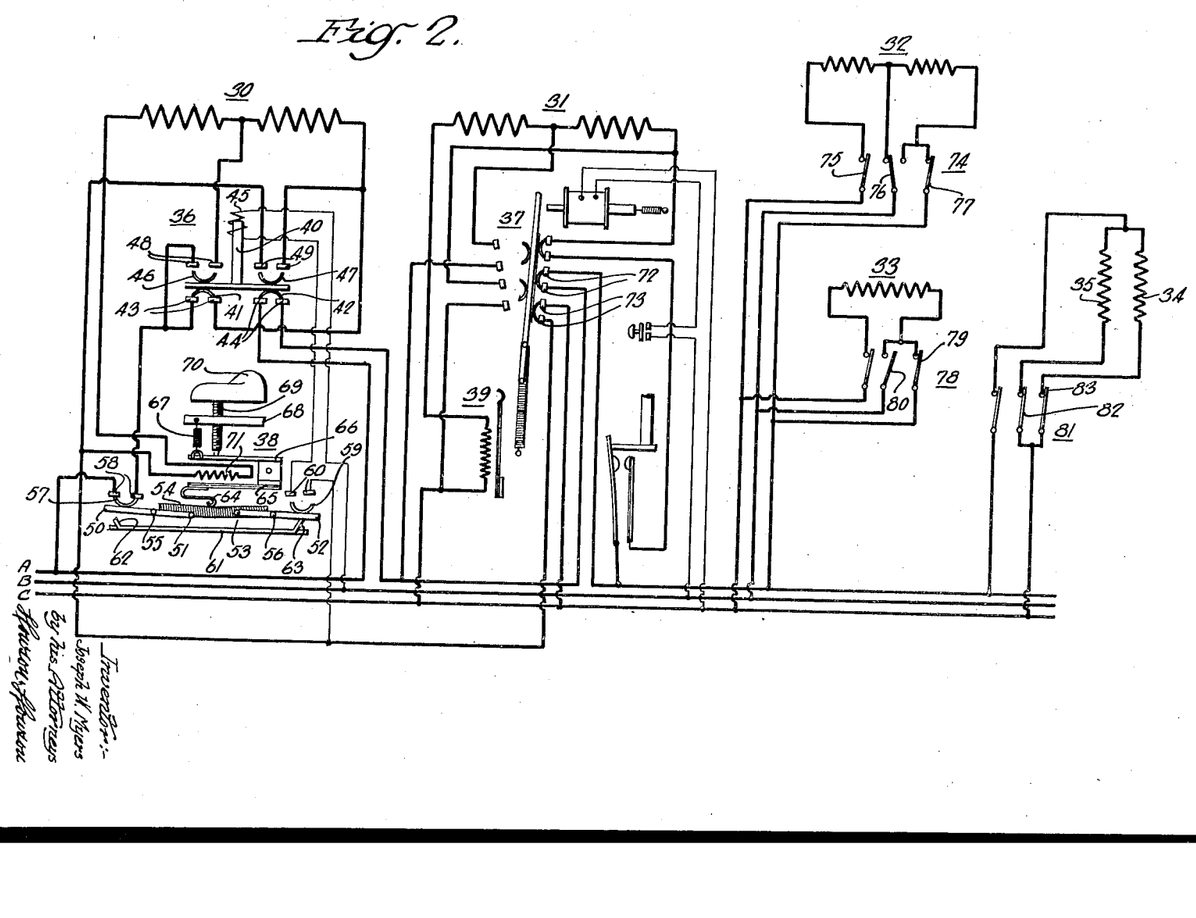
Fig. 2 is a similar illustration of another form of the system.

In Fig. 2, there is shown a diagrammatic illustration of an electric range which comprises four surface cooking units, two of which are adapted to be flashed, an oven unit, and a broiler unit. The surface cooking units 30 and 31 are multi-section units which are adapted to be flashed in the manner above described, while the other two surface cooking units are shown at 32 and 33, respectively. The oven unit is shown at 34, while the broiler unit is shown at 35.

In this instance, the flashable units 30 and 31 are provided with flashing contactors 36 and 37, respectively, which in turn, are controlled by the respective thermostatic control devices 38 and 39. It will be noted that the devices and circuits associated with unit 31 are similar to those of Fig 1 and operate in the same manner. The control devices for unit 30, however, are of a different character. The electromagnetic contactor 36 comprises an armature 40 which is normally gravitationally disposed in the position shown with its lower contacts 41 and 42 engaging contacts 43 and 44, respectively, the armature is actuated to flash position by winding 45, and when the armature is thus actuated, its upper contacts 46 and 47 engage contacts 48 and 49, respectively. The armature contacts are insulated from one another and to this end the cross bar of the armature may be formed of insulating material. The core should, of course, be formed of magnetic material.

The device 38 comprises a dual switch structure constructed as follows. An arm 50 is pivoted at 51, while a second arm 52 is pivoted at point 53 which is offset with respect to point 51, as illustrated. A spring 54 has one end attached to arm 50 at 55 and its other end attached to arm 52 at 56. A contact 57 carried by arm 50 is adapted to engage stationary contacts 58, while a contact 59 carried by arm 52 is adapted to engage stationary contacts 60. A stationary stop bar 61 has a stop 62 which limits the movement of arm 50 and a stop 63 which limits the movement of arm 52. A finger 64 carried by a bimetallic strip 65 is adapted to engage and deflect spring 54 to cause successive operation of the two switches. When the spring is fully relaxed, it is predominately above the pivots 51 and 53 and both switches are closed and are thus maintained by the spring. As the finger 64 engages and deflects the spring downward, the spring is deflected about point 55 as a pivot, and the arm 52 is moved downward with a snap movement against stop 63, as shown, thus opening contacts 59 and 60. Continued downward movement of finger 64 deflects spring 54 about point 56 as a pivot and snaps the arm 50 downward against the stop 62, thus opening contacts 57 and 58. The spring tends to move the arm 50 upward, however, and when the finger 64 moves upward, the arm 50 first moves upward, closing the contacts 57 and 58, and then the spring moves arm 52 upward, closing contacts 59 and 60. This successive operation of the switches results from the offset relation of the pivot points 51 and 53 and the arrangement of the spring. The arms and spring thus form a double toggle arrangement, while the stops 62 and 63, by limiting the movement of the arms, enable the spring to urge the arms to switch-closing positions.

The thermostatic strip 65 is carried by a pivoted support 66 which is urged clockwise by spring 67, the upper end of which is affixed to the stationary support 68 for the adjustable screw 69. By means of knob 70, the screw 69 may be adjusted vertically to vary the position of support 66 and hence the position of strip 65.

The thermostatic strip is actuated by heater 71 which causes the strip to flex downward to effect operation of the switches, as above described. The switch 59, 60 controls the energization of winding 45 and thus controls the flashing of heating unit 30, while the switch 57, 58 controls the energization of the heating unit. The adjustment of the thermostatic strip varies the operating temperature level and the temperature level to which the heating unit is flashed. Thus, the heating unit 30 may be flashed to, and operated at, any one of a plurality of temperature levels. The higher the screw 69 is moved, the higher will be the selected temperature level to which the heating unit is flashed and at which it is operated, since the greater will be the distance through which the thermostatic strip is required to move to open the switches. The upward movement is, of course, limited by a stop or otherwise to prevent flashing to too high a temperature. The lower the screw 69 is moved, the lower will be the selected temperature level. For any selected temperature level, the switch 59, 60 will open first to restore the normal series connection of the heating unit sections, and the switch 57, 58 will then maintain the unit at the selected temperature level. It will be noted further that the heating unit will be flashed automatically whenever the control device is adjusted for a temperature level substantially higher than the level at which the unit has been operating. Sufficient downward movement of screw 69 de-energizes the heating unit.

It will be noted that the contacts 44 of contactor 36 and the contacts 72 of contactor 37 are included in the supply conductor A so that when either of the contactors is actuated to flash position, the supply conductor A is opened with respect to subsequent load. The opening of contacts 44 when contactor 36 is actuated to flash position, renders the heating unit 31 inoperative since this unit is connected to supply conductor A on the side of contacts 44 opposite the energizing source. It will be noted further that the contacts 73 of contactor 37 are included in the energizing circuit of heating unit 30, and, therefore, when the contactor 37 is actuated to flash position, unit 30 is rendered inoperative. Thus, it will be seen that only one of the heating units 30 and 31 may be flashed at one time and during the flashing of one unit the other is rendered inoperative.

It is important to note that while only one of the units 30 and 31 may be flashed at one time, the flashing of unit 30 may be delayed by initiating the flash of unit 31. Suppose, for example, that during the flashing of unit 30, the contactor 37 is actuated to flash unit 31. This will interrupt the flashing of unit 30 until after unit 31 is flashed, at which time the flashing of unit 30 will be resumed, unless device 38 is adjusted to prevent it. Thus, if one intended to flash unit 31 but accidentally initiated flash of unit 30 instead, the flash may be interrupted and unit 31 flashed at once.

If, however, during flashing of unit 31, it is attempted to initiate flashing of unit 30, the flashing of unit 30 will be delayed until after the flashing of unit 31 is completed. Thus, in this instance, the flash of one unit may be "ordered" during the flash of another unit.

The control devices for heating units 30 and 31 are representative of various forms of devices which may be employed. These different types of control devices are illustrated in the system of Fig. 2 merely for the purpose of disclosure. Obviously both control devices may be similar and may take either of the forms shown or any other suitable form.

Considering now the heating unit 32, this unit is operable at three different temperature levels, which may be designated "low," "medium," and "high," respectively, by means of a control switch 74. This control switch comprises three movable contact arms or switch elements 75, 76 and 77, the arm 76 being movable to either of two effective positions. When the contact arms are in the positions shown, the switch is adjusted for "high" operation. When arm 77 is in open position, the switch is adjusted for "medium" operation, with one section of the heating unit connected across the low voltage supply conductors B and C. When arm 77 is open and arm 76 thrown to its other position, both sections of the heating unit are connected in series across the low voltage conductors for "low" operation. The contact arms may be actuated by suitable cams mounted upon a common rotatable shaft so that the position of the shaft will determine the setting of the switch. Since this construction of switches is well understood, it is deemed unnecessary to illustrate it specifically. It will be understood, of course, that the switch 74 may take any suitable form.

Heating unit 33 is controlled by a switch 78 of the same general character, but adjustable to "high" and "low" positions only. In the position shown, the unit 33 is connected across the high voltage conductors. When arm 79 is open and arm 80 closed, the heating unit is connected across the low voltage conductors B and C for "low" operation.

It may now be noted that whenever either of the flashable heating units 30 and 31 is being flashed, the heating units 32 and 33 are prevented from operating at their high temperature level, since the high operation of either of the units 32 and 33 requires that the supply conductor A be energized. Obviously, since the supply conductor A is opened when either of the heating units 30 and 31 is being flashed, the unit 32 can be operated only at its "medium" or "low" levels while unit 33 can be operated only at its "low" level. This serves to limit the total connected load of the apparatus during the flashing operation.

As stated above, the heating unit 34 represents the oven unit while the heating unit 35 represents the broiler unit. A manually-operable switch 81 serves to connect these heating units in parallel relation across the high voltage outer supply conductors in order that these units may be preheated, and also serves to connect either of these units across the outer supply conductors so that the units may be operated selectively. When both of the arms 82 and 83 are closed, the units 34 and 35 are connected in parallel. When arm 82 is open, the oven unit 34 is energized alone. When arm 83 is open, the broiler unit 35 is energized alone.

Since the heating units 34 and 35 depend for their energization upon the energization of supply conductor A, it will be seen that when either of the flashable units 30 and 31 is being flashed, the heating units 34 and 35 are rendered inoperative. This also serves to limit the total connected load of the apparatus during a flashing operation.

Figure 3:
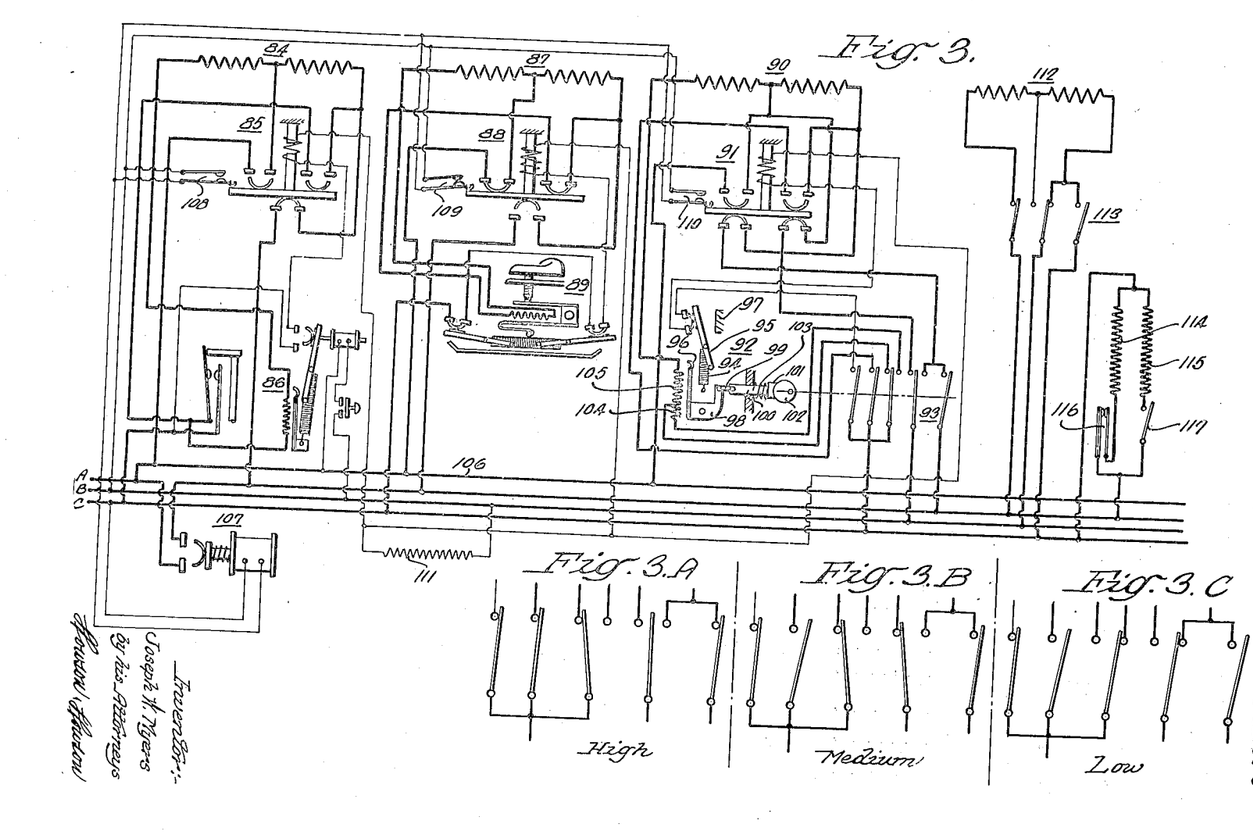
Fig. 3 is a similar illustration of a further embodiment employing a line relay and a limiting resistance.

In Fig. 3, there is illustrated a further embodiment of the invention in which there are provided three flashable heating units adapted to be flashed selectively. The flashable unit 84 is controlled by contactor 85 and flash-control mechanism 86. The heating unit 87 is controlled by contactor 88 and flash-control mechanism 89. These control devices for the units 84 and 87 are similar to those employed in the previously described systems and operate in the same manner. The heating unit 90 is controlled by contactor 91, flash-control mechanism 92, and control switch 93. The contactor 91 is believed to require no detailed description in view of the previous description relative to this same type of device. The flash-control mechanism 92 is somewhat similar to that employed in Fig. 1, but, in this instance, the spring 94 continuously urges the arm 95 to the position shown and the thermostatic element 96 deflects the spring to move the arm 95 clockwise about its pivot against a stop 97 which limits the movement of the arm, the spring continuously tending to return the arm to its switch-closing position. The thermostatic strip 96 is carried by a pivotal member 98 which is connected by a link 99 to a reciprocable rod 100, on the end of which there is a cam follower 101 engaging a cam 102. A spring 103 maintains the cam follower in engagement with the cam. The cam is mounted upon a rotatable shaft which also serves to effect adjustment of the control switch 93, as indicated by the broken line representation. For example, the arms of the switch 93 may be actuated by cams on a common rotatable shaft which also carries the cam 102. In this manner, the thermostatic element 96 may be adjusted in accordance with the adjustment of the switch 93.

The switch 93 varies the connections of the multi-section heating unit 90 and adapts the heating unit for operation at "high," "medium" and "low" temperature levels. The positions of the switch arms for these different settings of the switch are shown in Figs. 3A, 3B and 3C. When the switch is in its "high" position, the entire heating unit 90 is connected across the high voltage supply conductors. During "flash to high" operation, the heating unit sections are connected in parallel, while during "high normal" operation the sections are connected in series. When the switch is in its "medium" position, during "flash to medium" operation, the left hand section of the heating unit is connected alone across the high voltage supply conductors, while during "medium normal" operation the left hand section is connected across the two lower low-voltage supply conductors. When the switch is in its "low" position, during "flash to low" operation, the left hand section is connected across the high voltage supply conductors, while during "low normal" operation both sections are connected across the low voltage conductors. These various connections of the heating unit, which are effected by the switch 93, may be seen from Figs. 3A, 3B and 3C in conjunction with Fig. 3. Thus, in each of the three positions of the switch 93, the heating unit is adapted to be flashed to the temperature level corresponding to the particular switch setting.

As noted above, the thermostatic element 96 is adjusted in accordance with the position of the switch 93. When the switch is in either the "high" position or the "medium" position, the thermostatic element is further away from the spring 94 than it is when the switch is in the "low" position. In other words, at the higher temperature levels selected by the adjustment of switch 93, the thermostatic element 96 is required to flex further in order to interrupt the energizing circuit of the flash contactor 91. In this manner, the heating unit is flashable under control of the thermostatic element 96 to the different temperature levels corresponding to the positions of switch 93.

The cam 102 should be so designd that the position of the thermostatic element is the same for "medium" as it is for "high", since otherwise the left hand section of unit 90 would be insufficiently heated during "flash to medium", which in fact involves full energization of the left hand section of the unit, as shown.

It will be noted that when the switch 93 is in its "low" position, an additional resistance element 104 is added to the main heater 105 for the thermostat 96. During "medium" and "high" operation, the additional heater 104 is excluded from the circuit. This additional heater element is added during "low" operation in order that the heater will have sufficient capacity when it is receiving the low amplitude currents flowing during the "low" operation.

The three different types of flash-control devices shown in Fig. 3 are embodied in this apparatus merely to disclose different types of devices which may be employed. The three flash-control devices may be similar, if desired, and they may take the form of any one of three different types illustrated, or they may take any other suitable form.

The system of Fig. 3 employs an additional supply line 106 for supplying "flash current" to the several flashable heating units, permitting the main supply line conductor A to be interrupted by the relay 107 which is energized when any one of the flash contactors moves to flash position. To this end, there are associated with the flash contactors 85, 88 and 91 normally open switches 108, 109 and 110, each of which is closed by the armature of the associated contactor when it moves to "flash" position. These switches are arranged so that each of them will close just prior to the closing of the flash contacts of the associated contacts. Thus, in the illustration, the flash contactor 88 is in "flash" position so that the switch 109 associated therewith is closed. Each of these switches is adapted to control the energization of relay 107, as will be readily apparent. The energizing of the relay, as illustrated, opens the main supply conductor A, thus preventing "normal" operation of the other flashable heating units from conductor A. Considering the condition illustrated, for example, with the heating unit 87 being flashed, it will be apparent that "normal" operation of units 84 and 90 from conductor A is prevented. It will be seen, however, that unit 90 may be operated at medium and low normal levels, since conductors B and C are not opened.

To control the flashing of the heating units, a limiting resistor 111 is included in the energizing circuits of all of the flash contactors. This resistor limits the energizing current to a predetermined value sufficient to permit only one or a proper number of the contactors to be actuated at one time. Assuming that one contactor is actuated, if the energizing circuit of another is closed, the two contactor windings are connected in parallel and the current is divided between the two. Now if the current value is such that one-half of the current is sufficient to maintain the actuated contactor in "flash" position but is insufficient to move the second contactor to "flash" position, then the second contactor will not be actuated until the first contactor returns to normal. Obviously, by having the current of such value that one-half of the current will move a contactor to "flash" position, and one-third of the current will hold a contactor in "flash" position, provision is made for flashing two units at one time but not the third unit.

To enhance the control of the flashing of the heating units, the contactors 85, 88 and 91 each has a stationary magnetic pole piece arranged cooperatively with the movable armature core, as illustrated. When a contactor is energized the current flow in the energizing winding magnetizes or increases the magnetism of the pole piece, but the magnetic attractive force of the pole piece exerts little effect upon the armature until the armature core is close to the pole piece. Therefore, the magnetic field within the energizing winding is the primary motivating force for the armature, but when the armature is in flash position, the pole piece helps materially to hold it in that position. Due to the force exerted by the pole piece, the contactor may be maintained in flash position by energizing current whose magnitude is only a fraction of that necessary to move the contactor to flash position.

It is important to note that in the system of Fig. 3 while only one or a limited number of the heating units may be flashed at one time, the flash of another unit may be "ordered" during the flash of the first-mentioned units. For example, assuming that only one unit may be flashed at one time and that unit 87 is being flashed as illustrated, suppose that it were attempted to flash unit 84. The operation of device 86 will close the energizing circuit of contactor 85 but the current is insufficient to actuate this contactor. When the flashing of unit 87 is completed, however, the opening of the energizing circuit of contactor 88 will permit sufficient current to flow through the energizing winding of contactor 85 to operate this contactor, whereupon unit 84 will be flashed.

The heating unit 112 and its associated switch 113 are similar to unit 32 and switch 74 of Fig. 2 and require no further description.

The heating units 114 and 115 likewise correspond to the units 34 and 35 of Fig. 2. Switches 116 and 117 serve the same purpose as switch 81 of Fig. 2, as above described. In this instance, however, switch 116 is shown as a thermostatic switch for the oven unit 114.

It will be noted that the opening of supply conductor A, as above described will render units 114 and 115 inoperative and will prevent unit 112 from being operated at its "high" temperature level.

Figure 4:
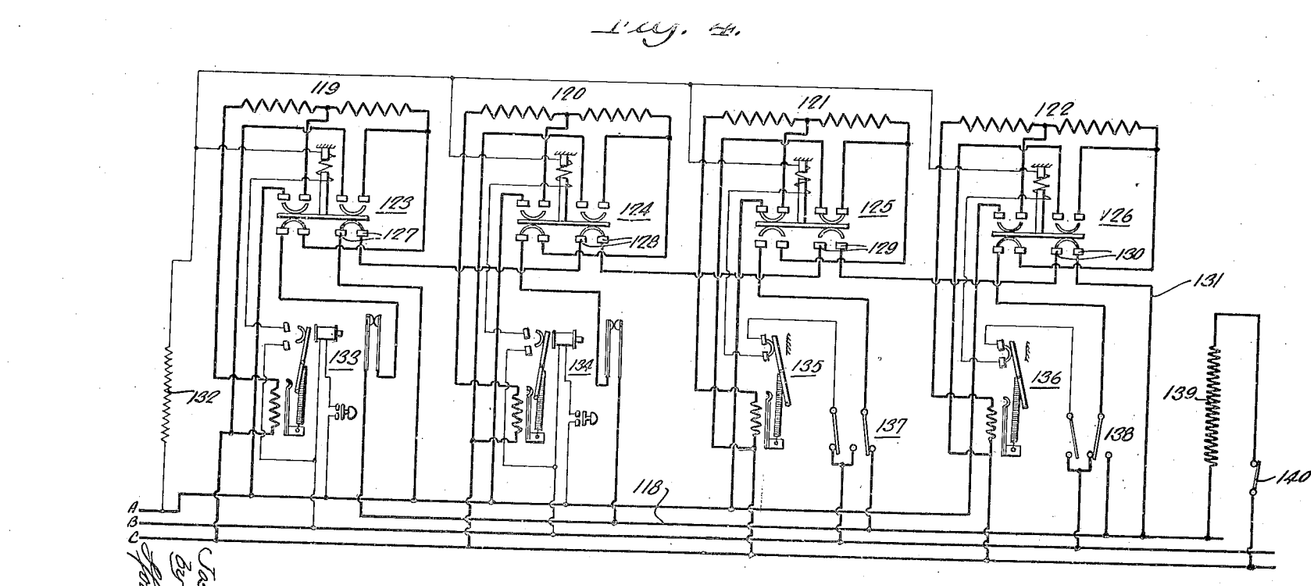
Fig. 4 is an illustration of a further embodiment which eliminates the necessity for a line relay.

In Fig. 4 there is illustrated a further embodiment of the invention in which similar results are obtained without the necessity of employing a line relay such as is used in the system of Fig. 3. The elimination of the line relay is made possible in the system of Fig. 4 by employing an additional supply conductor 118 and by connecting this conductor to the supply conductor A through a connection which includes certain "normal" contacts of all of the flash contactors in series. In this instance, there are employed four flashable heating units 119, 120, 121 and 122 whose respective flash contactors are designated 123, 124, 125 and 126 and are similar to those of Fig. 3. The "normal" contacts 127, 128, 129 and 130 of the four contactors are included serially in the connection 131 between the conductor 118 to the supply conductor A. It will be seen, therefore, that when any one of the flash contactors is actuated to flash its associated heating unit, the connection 131 is broken, thus preventing "normal" energization of the other heating units from conductor 118 which must be energized from conductor A for "normal" energization of the heating units. The flash current is available, however, to all of the heating units through the supply conductor A.

In this instance, a limiting resistance 132 is employed to limit the number of units which may be flashed at one time, as described above in connection with Fig. 3. It will be noted that the limiting resistance 132 is common to the energizing circuits of all of the flash contactors, and by assigning a proper value to this resistance, the energizing current may be limited to a particular value such that only one contactor or a predetermined number of contactors may be actuated at one time. It will be noted also that in this instance the flash of a unit may be "ordered" during the flashing of another unit, as described above in connection with Fig. 3.

The flash contactors in this instance are similar to those of Fig. 3 and require no further description. The flash control mechanism 133 and 134 associated respectively with the heating units 119 and 120 are each of a form disclosed in the previously discussed figures and require no further discussion. The flash control mechanisms 135 and 136 associated respectively with the heating units 121 and 122 are of the general type employed in conjunction with the heating unit 90 of Fig. 3, but in this instance the thermostatic elements are not adjustable. There are provided, however, similar control switches 137 and 138 each having "high" and "low" positions. Switch 137 is shown in its "high" position, while switch 138 is shown in its "low" position. Since the flash control mechanisms 135 and 136 are normally in the switch-closing positions shown, when either of the control switches 137 and 138 is moved to its "high" position, the energizing circuit of the associated contactor is closed, thereby automatically effecting "flash to high" operation. It will be noted, however, that the heating units cannot be "flashed to low." The "high" and "low" operations of the heating units are effected by the different voltage connections brought about by the control switches 137 and 138.

The heating unit 139 is representative of the broiler and oven units of the range, and the switch 140 is representative of the control switches for these units. It will be apparent that when the connection 131 is interrupted by the flashing of any one of the surface cooking units, as above described, the heating unit or units 139 will be rendered inoperative during the flashing operation.

Figure 5:
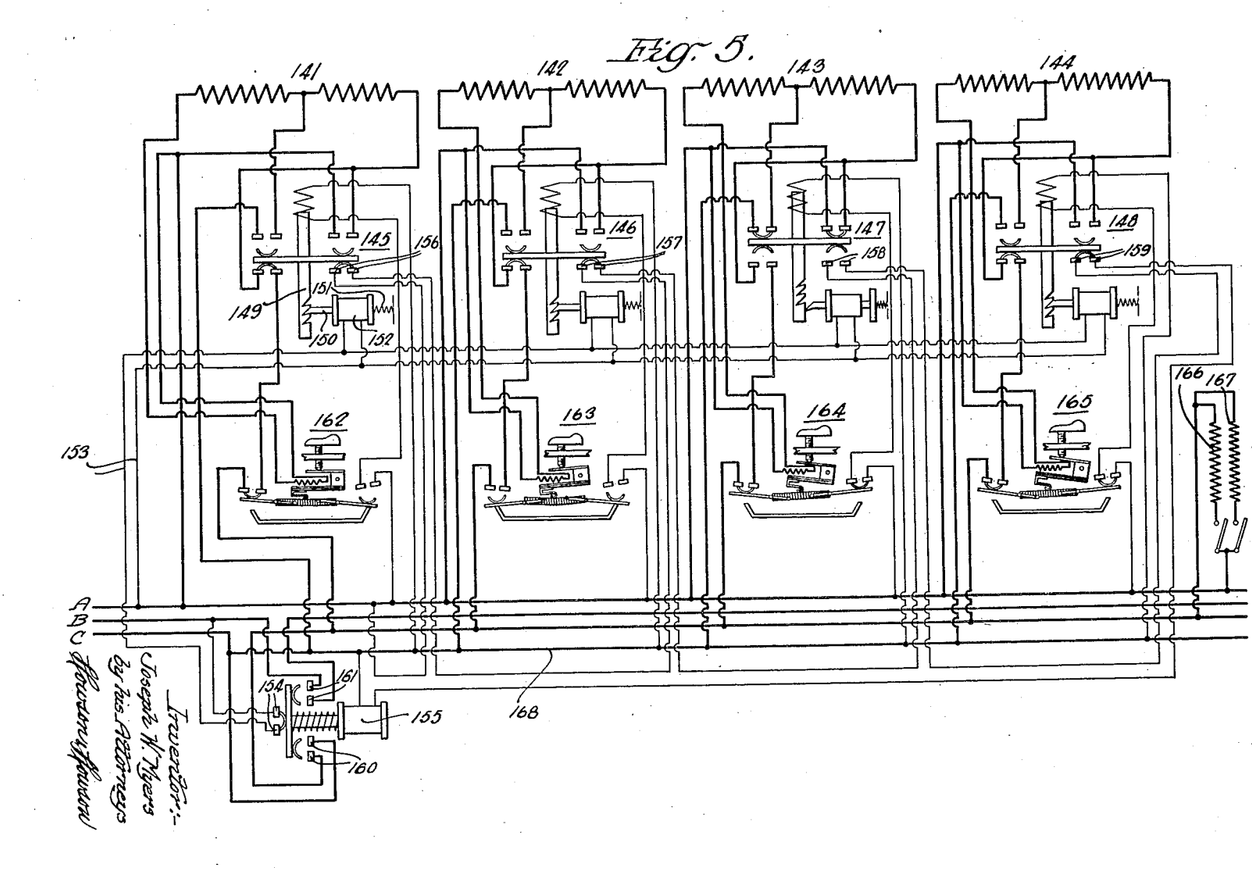
Fig. 5 is an illustration of a further embodiment employing an interlocking arrangement.

In Fig. 5 there is disclosed a further embodiment of the invention in which the flashing of more than one heating unit at one time is prevented, by means of an electro-magnetic interlocking mechanism. In this instance, there are shown four flashable heating units 141, 142, 143 and 144 having associated flash contactors 145, 146, 147 and 148. The armature of each of these flash contactors has an extending portion 149 with notches therein to provide a latch bar engageable by an electromagnetically operated pawl 150. The pawl is normally held out of engagement with the rack by means of a biasing spring 151, but when the solenoid 152 is energized, the pawl is moved against the action of the spring into interlocking relation with the associated latch bar, as shown. The biasing spring has only enough strength to move the pawl if no other force is applied to the pawl. The four solenoids associated with the four flash contactors have a common energizing circuit 153 which is controlled by the contacts 154 of relay 155. The energizing circuit of this relay includes serially the "normal" contacts 156, 157, 158 and 159 of the four flash contactors.

When all of the contactors are in "normal" position, the relay 155 is energized, as will be clearly obvious, and the relay contacts 154 are opened so that the locking magnets 152 are deenergized. The relay contacts 160 and 161 are closed, thereby closing the line conductors B and C. When any one of the contactors is actuated, as shown in the illustration wherein the contactor 147 is in "flash" position, the energizing circuit of relay 155 is opened, thereby causing the spring-biased armature of the relay to move to the position shown, opening contacts 160 and 161 and closing contacts 154. The locking magnets are thereby energized, causing their locking pawls to engage the associated latch bars, and thus locking all of the flash contactors, other than the one actuated, in normal position. Since the supply conductor C is opened, normal energization of any flashable unit is prevented. It will be noted, however, that the auxiliary conductor 168 supplies "flash" current to all of the heating units and also supplies energizing current to the contactors. When the flashing operation is completed, the relay 155 is again energized, and in turn deenergizes the locking magnets so that any of the other heating units may be flashed, except as noted below.

Suppose, however, that during the flashing of one unit, it is attempted to flash another unit. To illustrate this, the flash control mechanism 165 is shown adjusted for flash. The consequent energization of the flash contactor 148, however, merely increases the locking of its armature, since the pull on the latch bar against its pawl increases the locking tension. Now when the contactor 147 returns to normal at the completion of the flashing of unit 143, relay 155 is energized, opening the energizing circuit of the locking magnets and closing supply conductors B and C. But the tension between the latch bar and pawl of contactor 148, prevents the relatively small force of the spring from withdrawing the pawl, and therefore unit 144 is energized normally, the contactor clearing itself when its energizing circuit is opened by device 165.

The flash control mechanisms 162, 163, 164 and 165 are of a type employed in the systems of Figs. 2 and 3 and described above.

The heating units 166 and 167 represents the oven and broilers units, and are provided with control switches, as previously described.

From the above description, it will be seen that the invention provides for the control of the number of heating units which may be flashed at one time and also limits the total connected load during flashing operation. Obviously, in any given instance the system may be arranged to prevent the total connected load from exceeding a permissible value. The invention also contemplates the use of any of the several forms of control devices described above. It will be apparent that other embodiments and modifications of the invention are possible.

It will be understood from the foregoing description that the term "flashing" employed in the appended claims means the application to a cooking unit of materially greater energy than that supplied to the unit during normal operation.

I claim:

1. In an electrical cooking apparatus, a supply line, an electric cooking unit connected to said line, additional load devices comprising at least one other cooking unit connected to said line, manually operable switches for supplying normal energizing current to any one or all of said units, a mechanism for flashing said first unit and for dropping at least a portion of the additional load for the duration of the flashing operation only, said mechanism comprising a two-position switch having load dropping contacts at one position controlling the circuit of the load to be dropped and having flashing contacts at its other position arranged to effect the flashing of said first unit, the said switch when in the first-mentioned position including the said load in circuit with said line and when in its other position excluding such load from the circuit and flashing said first unit through the medium of said flashing contacts, and a device operatively associated with said switch to move the same to said first-mentioned position when said first unit reaches substantially a predetermined temperature, to thereby interrupt the flashing operation and restore the dropped load to the energizing circuit.

2. In an electrical cooking apparatus, a supply line, an electric cooking unit, connections for supplying normal energizing current from said line to said unit, other connections for supplying flashing current to said unit, additional load devices comprising at least one other cooking unit connected to said line, manually operable switches for supplying normal energizing current to any one or all of said units, a manually-controllable mechanism for flashing said first unit at will and for dropping at least a portion of the additional load for the duration of the flashing operation only, said mechanism comprising a two-position switch having contacts at one posotion for completing said first-mentioned connections and for energizing said additional load and flashing contacts at the other switch position for completing said last-mentioned connections, the said switch when in the first-mentioned position including the said load in circuit with said line and when in its other position excluding such load from the circuit and flashing said first unit through the medium of said flashing contacts, and a device operatively associated with said switch to move the same to said first-mentioned position when said first unit reaches substantially a predetermined temperature, to thereby interrupt the flashing operation and restore the dropped load to the energizing circuit.

3. In an electrical cooking apparatus, a plurality of flashable cooking units, at least one non-flashable unit, a manually-controllable flashing mechanism operatively associated with each of said flashable units whereby such units may be selectively flashed at will, connections controlled by said flashing mechanisms for preventing the flashing of more than one unit at a time and for restricting the energization of said non-flashable unit during a flashing operation, and a device operatively associated with each flashing mechanism for automatically terminating a flashing operation and for restoring normal energization of said non-flashable unit when the unit being flashed is heated to a substantially predetermined temperature.

4. In an electrical heating apparatus, a plurality of electrical heating units, means for supplying predetermined energizing current to any one or all of said units simultaneously to effect normal energization of said units, a control switch associated with each unit for greatly increasing the energizing current thereto, to thereby cause said unit to heat rapidly to a predetermined temperature level, at least one heating unit arranged for normal energization only, and contacts on said control switches arranged to restrict the number of said first-mentioned units which may be overenergized at one time and also arranged to restrict the energization of said last-mentioned unit during over-energization of any of the first-mentioned units.

5. In an electrical cooking apparatus, an electrical supply line, a plurality of cooking units connected successively to said line, normally inoperative connections for each of said units whereby the energization of each unit may be greatly increased to heat said unit rapidly, at least one additional cooking unit subsequent to said first-mentioned units, a multi-position switch for each of said first-mentioned units, contacts at one position of each switch connected serially in one of the supply conductors, whereby movement of any one of said switches from said position opens the said supply conductor to subsequent units, contacts at another position of each switch for closing the rapid-heating connections of the associated unit, and means associated with each switch for automatically moving the switch to the first-mentioned position when the associated unit has been heated to a desired operating temperature.

6. In an electric range, a plurality of cooking units arranged for selective or simultaneous operation, at least one additional cooking unit, manual control switches operatively associated respectively with said units for controlling their normal energization, normally inoperative connections for each of said first-mentioned units whereby the energization of a unit may be greatly increased to heat said unit rapidly, a two-position switch for each of said first-mentioned units normally disposed in one position, contacts at the other position of each two-position switch for closing the rapid heating connections of the associated unit, contacts at the normal position of each two-position switch adapted to control the energization of subsequent units and prevent increased energization of more than one unit at a time, each of said two-position switches being arranged to open its normal position contacts before closing its other contacts, whereby each said switch first deenergizes the subsequent units and then completes the rapid heating connections for its associated unit, and means for automatically returning each two-position switch to its normal position when its associated unit has been heated to a desired operating temperature.

7. In electrical heating apparatus, a plurality of electrical heating units, means for supplying predetermined energizing current to any one or all of the units simultaneously to effect normal energization of the units, a plurality of switches operable to vary the connections of said units to greatly increase the energizing current thereto, to thereby cause the units to heat rapidly to a predetermined temperature level, means selectively operable during the increased energization of one of said units for conditioning another of said units for increased energization, and means for delaying increased energization of the said other unit until the energization of said first unit is decreased, whereby overloading of the supply line is prevented and the conditioned unit is automatically abnormally energized at the termination of abnormal energization of said first unit.

8. In electrical heating apparatus, a plurality of electrical heating units, means for energizing said units, control means associated with each said unit for increasing the energization thereof to above normal, to thereby cause each unit to heat rapidly to a predetermined temperature level, means operative during the increased energization of one unit for conditioning the control means of another unit for abnormal energization and for simultaneously interrupting the abnormal energization of said one unit, means for terminating the abnormal energization of said other unit when it reaches the said temperature level, and means for automatically resuming the abnormal energization of said one unit upon the termination of the abnormal energization of said other unit.

9. In electrical heating apparatus, a plurality of electrical heating units, means for energizing said units, control means associated with said units for increasing the energization thereof to above normal, to thereby cause each unit to heat rapidly to a predetermined temperature level, means manually operable during the increased energization of one unit for abnormally energizing another unit and for simultaneously interrupting the abnormal energization of said one unit, means for terminating the abnormal energization of said other unit when it reaches the said temperature level, and means for automatically resuming the abnormal energization of said one unit upon the termination of the abnormal energization of said other unit.

10. In an electrical heating apparatus, a plurality of electrical heating units, means for supplying predetermined energizing current to any one or all of said units simultaneously to effect normal energization of said units, a control switch associated with each unit for greatly increasing the energizing current thereto, to thereby cause each unit to heat rapidly to a predetermined temperature level, contacts on the control switch for one of the heating units arranged to prevent the supply of over-energization currents to another of said units when such switch is in increased energization position, and contacts on the control switch for said other unit arranged to prevent the supply of over-energization currents to said one unit when such switch is in increased energization position, whereby only one of the said units may be excessively energized at one time.

11. In an electrical cooking apparatus, a plurality of electrical heating units, connections for supplying predetermined energizing current to each of said units to effect normal energization thereof, other connections for supplying increased energizing current to each of said units to effect rapid heating thereof, a two-position switch for each unit arranged to complete said first-mentioned connections in one position and to complete said second-mentioned connections in its other position, contacts at the first-mentioned position of one switch arranged to control the energization of the rapid-heating connections controlled by another switch; and contacts at the first-mentioned position of said other switch arranged to control the energization of the rapid-heating connections controlled by said one switch, whereby either switch when actuated to effect rapid heating of its associated unit prevents the other switch from effecting rapid heating of its associated unit.

12. In an electrical cooking apparatus, an electric cooking unit, at least one other cooking unit, means for energizing said units either simultaneously or selectively, manually-adjustable means for operating said first unit at any one of a plurality of selectable temperatures, normally inoperative means for flashing said first unit to effect rapid heating thereof, means responsive to temperature-increasing adjustment of said manual means for rendering said flashing means operative, means for restricting the energization of said other unit during the flashing of said first unit, and means for automatically terminating the flashing operation and restoring normal energization of said other unit when said first unit reaches substantially a predetermined temperature level.

13. In an electrical cooking apparatus, an electric cooking unit, at least one other cooking unit, means for energizing said units either simultaneously or selectively, manually-adjustable means for operating said first unit at any one of a plurality of selectable temperatures, normally inoperative means for flashing said first unit to effect rapid heating thereof, means responsive to temperature-increasing adjustment of said manual means for rendering said flashing means operative, means for restricting the energization of said other unit during the flashing of said first unit, and means variously conditioned by said manual means for automatically terminating the flashing operation and restoring normal energization of said other unit when said first unit reaches substantially the selected temperature level.

14. In an electrical heating apparatus, an electrical heating unit, at least one other electrical heating unit, manually adjustable control means for operating said first unit at different energy outputs and for deenergizing the unit at will, a two-position switch, electrical connections controlled by said switch in one of its positions for energizing said first unit normally with said control means in circuit therewith and for supplying normal energy to said other unit only during normal energization of the first unit, and other electrical connections controlled by said switch in its other position for increasing the energization of said first unit to above normal and for excluding said control means from the circuit, whereby said first unit is under the control of said control means only during normal energization of the unit.

15. In an electrical heating apparatus, an electrical heating unit, at least one other electrical heating unit, electrical connections for energizing said first unit normally, other electrical connections for increasing the energization of said unit to above normal and for simultaneously preventing energization of said other unit, a two-position switch for controlling said connections, said switch being constructed and arranged to dispose itself normally in a position to render said first connections effective and to render said other connections ineffective, and means for moving said switch to its other position and for retaining it in such position to thereby render said first connections ineffective and to render said other connections effective, whereby said switch automatically restores the normal connections in the event of failure of said last means.

16. In electrical heating apparatus, a plurality of electrical heating units, means including a multi-conductor supply line for supplying predetermined energizing current to any one or all of the units simultaneously to effect normal energization of the units, means for greatly increasing the energizing current to said units, to cause the units to heat rapidly to a predetermined temperature level, means for opening at least one conductor of said supply line whenever one of said units is overenergized, to thereby prevent normal energization of the units during increased energization of one of them, means including an additional supply conductor for energizing said units abnormally independently of the open supply conductor, and means for limiting the number of units which may be energized abnormally at one time.

17. In an electrical heating apparatus, a plurality of electrical heating units, a switch associated with each of said units to vary the connections of each unit so as to increase the energization thereof to above normal, a conductor for supplying abnormal energy to said units, a conductor for supplying normal energy to said units, a pair of normally closed contacts on each of said switches, and a conductor including said pairs of contacts in series and connecting said first-mentioned conductor to said second-mentioned conductor, whereby normal energization of any of said units is rendered impossible whenever any one of the units is abnormally energized.

18. In an electric cooking range, a plurality of electric heating units, means for supplying predetermined energizing current to said units, a switch associated with each of said units to vary the connections of each unit so as to greatly increase the energizing current thereto, at least one other heating unit on said range arranged for normal energization only, a conductor for supplying the increased energizing current to said first-mentioned units, a conductor for supplying normal energy to said other unit, a pair of normally closed contacts on each of said switches, and a conductor including said pairs of contacts in series and connecting said first-mentioned conductor to said second-mentioned conductor to energize the latter, whereby normal energization of said other unit is rendered impossible whenever any one of said switches is actuated to supply increased current to one of said first-mentioned units.

19. In an electric cooking range, a plurality of electrical heating units, means including a multi-conductor supply line for supplying predetermined energizing current to any one or all of said units simultaneously to effect normal energization of the units, manually-operable selective switch means for each unit for effecting normal operation thereof at different energy input levels, additional switch means for greatly increasing the energization of said units to a level higher than the highest energy level attainable by the use of said manual switches, a separate supply line for supplying the increased energizing current, means operable during the increased energization of one unit for rendering said first-mentioned supply line incapable of supplying normal energizing current to said units, thus preventing normal operation of said units, and means for restricting the energy draw on said separate supply line in the event that it is attempted to overenergize all of said units at one time.

20. In electrical heating apparatus, a plurality of electrical heating units, means for energizing said units, means including an electrical contactor associated with each unit for varying the connections of the unit to increase its energization to above normal, to thereby cause the unit to heat rapidly to a predetermined temperature level, an energizing circuit for each of said contactors, means for closing any one of said energizing circuits to actuate one of said contactors, means including an impedance common to said energizing circuits for limiting the number of contactors which may be actuated simultaneously, and means for preventing normal energization of said units by said contactors when any one of the contactors is actuated.

21. In electrical heating apparatus, a plurality of electrical heating units, means for energizing said units, means including an electrical contactor associated with each unit for varying the connections of the unit to increase its energization to above normal, to thereby cause the unit to heat rapidly to a predetermined temperature level, an energizing circuit for each of said contactors, means for closing any one of said energizing circuits to actuate one of said contactors, means including an impedance common to said energizing circuits for limiting the number of contactors which may be actuated simultaneously, and means including a relay for preventing normal energization of said units by said contactors when any one of the contactors is actuated.

22. In an electrical heating apparatus, a plurality of electrical heating units, means for energizing said units, means including an electrical contactor associated with each unit for varying the connections of the unit to increase its energization to above normal, to thereby cause the unit to heat rapidly to a predetermined temperature level, an energizing circuit for said contactors, energizing coils for the respective contactors connected in said energizing circuit in parallel with one another, means for closing any one of the branch circuits of said energizing coils to actuate the associated contactor, and an impedance serially connected in said energizing circuit of such value that the total current available to said energizing coils is insufficient to effect actuation of more than a predetermined number of contactors less than the total number thereof.

23. In electrical heating apparatus, a plurality of electrical heating units, means for supplying predetermined energizing current to said units, means including an electrical contactor associated with each unit for varying the connections of the unit to greatly increase the energizing current thereto, to thereby cause the unit to heat rapidly to a predetermined temperature level, an energizing circuit for each of said contactors, means for closing any one of said energizing circuits to actuate one of said contactors, means including an impedance common to said energizing circuits for limiting the number of contactors which may be actuated simultaneously, at least one other heating unit arranged for normal energization only, and means for restricting the energization of said other unit when any one of said contactors is actuated.

24. In electrical heating apparatus, a plurality of electrical heating units, means for energizing said units, means including an electrical contactor associated with each unit for varying the connections of the unit to increase its energization to above normal, to thereby cause the unit to heat rapidly to a predetermined temperature level, an electro-magnetic latch device arranged cooperatively with each contactor to mechanically prevent actuation of the contactor when the latch device is energized, and means responsive to the actuation of any one of said contactors for energizing the latch devices of the other contactors to prevent their operation.

25. In electrical heating apparatus, a plurality of electrical heating units, means for energizing said units, means including an electrical contactor associated with each unit for varying the connections of the unit to increase its energization to above normal, to thereby cause the unit to heat rapidly to a predetermined temperature level, an electrically operable latch device arranged cooperatively with each contactor to prevent actuation of the contactor when the latch device is actuated, a relay for controlling the energization of all of said latch devices, and means for actuating said relay to effect energization of said latch devices whenever one of said contactors is actuated, to thereby prevent actuation of the other contactors.

26. In an electrical heating apparatus, a plurality of electrical heating units, means for energizing said units, means including an electrical contactor associated with each unit for varying the connections of the unit to increase its energization to above normal, to thereby cause the unit to heat rapidly to a predetermined temperature level, an electrically operable latch device arranged cooperatively with each contactor to prevent actuation of the contactor when the latch device is actuated, a normally open energizing circuit for said latch devices, a relay for closing said energizing circuit and for preventing normal energization of said units, and means for actuating said relay whenever one of said contactors is actuated, to thereby prevent actuation of the other contactors.

JOSEPH W. MYERS.